Jan. 10, 1928. 1,656,138
M. BRESLAUER
METHOD AND MEANS FOR THE PHOTOGRAPHIC REPRODUCTION OF BOOKS,
DRAWINGS, AND THE LIKE, FOR REPRINTS
Filed Aug. 9, 1924 7 Sheets-Sheet 1

Max Breslauer
Inventor
by W. Mellroy
Attorney.

Jan. 10, 1928.  
M. BRESLAUER  
1,656,138  
METHOD AND MEANS FOR THE PHOTOGRAPHIC REPRODUCTION OF BOOKS,  
DRAWINGS, AND THE LIKE, FOR REPRINTS  
Filed Aug. 9, 1924   7 Sheets-Sheet 3

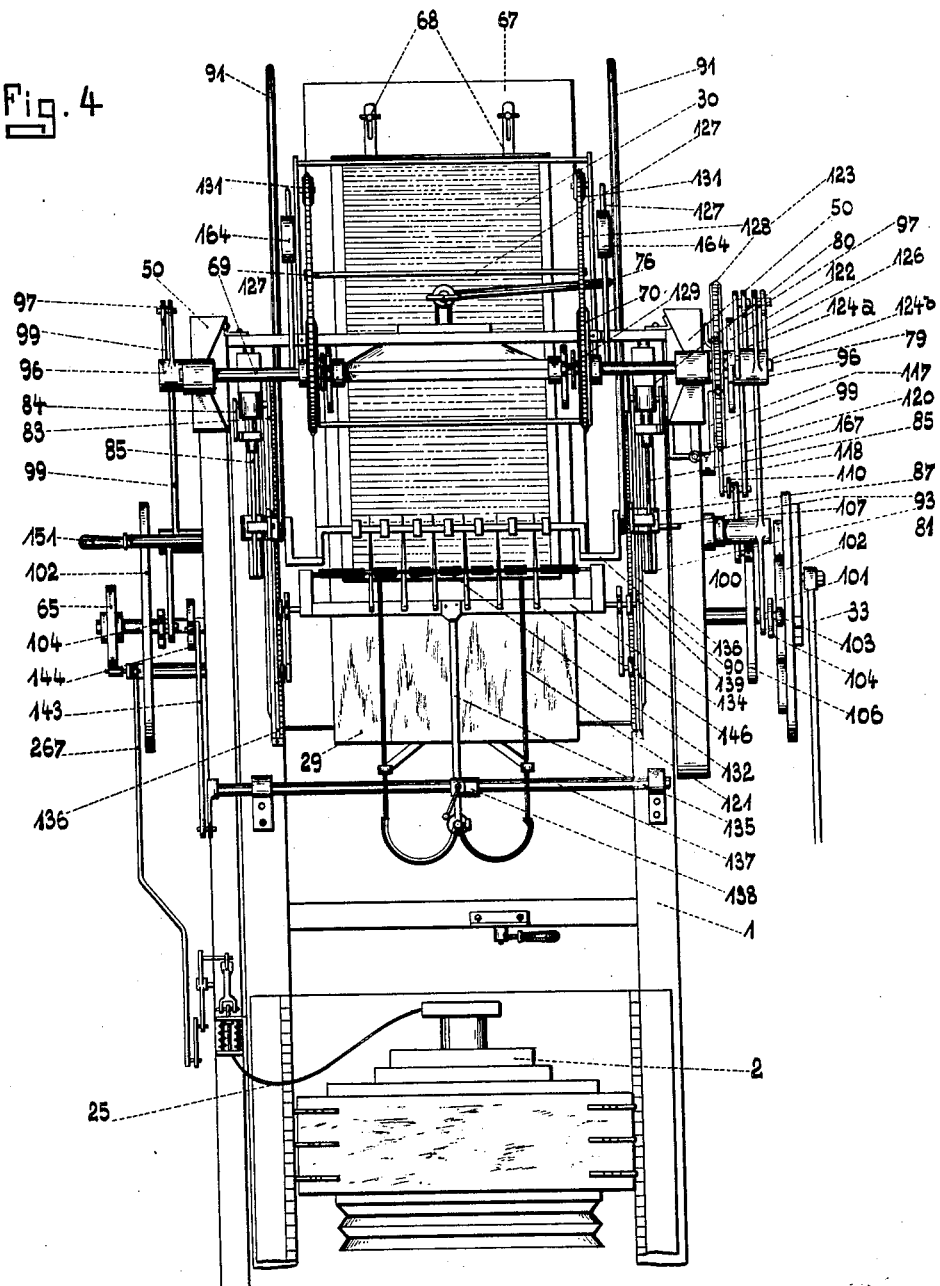

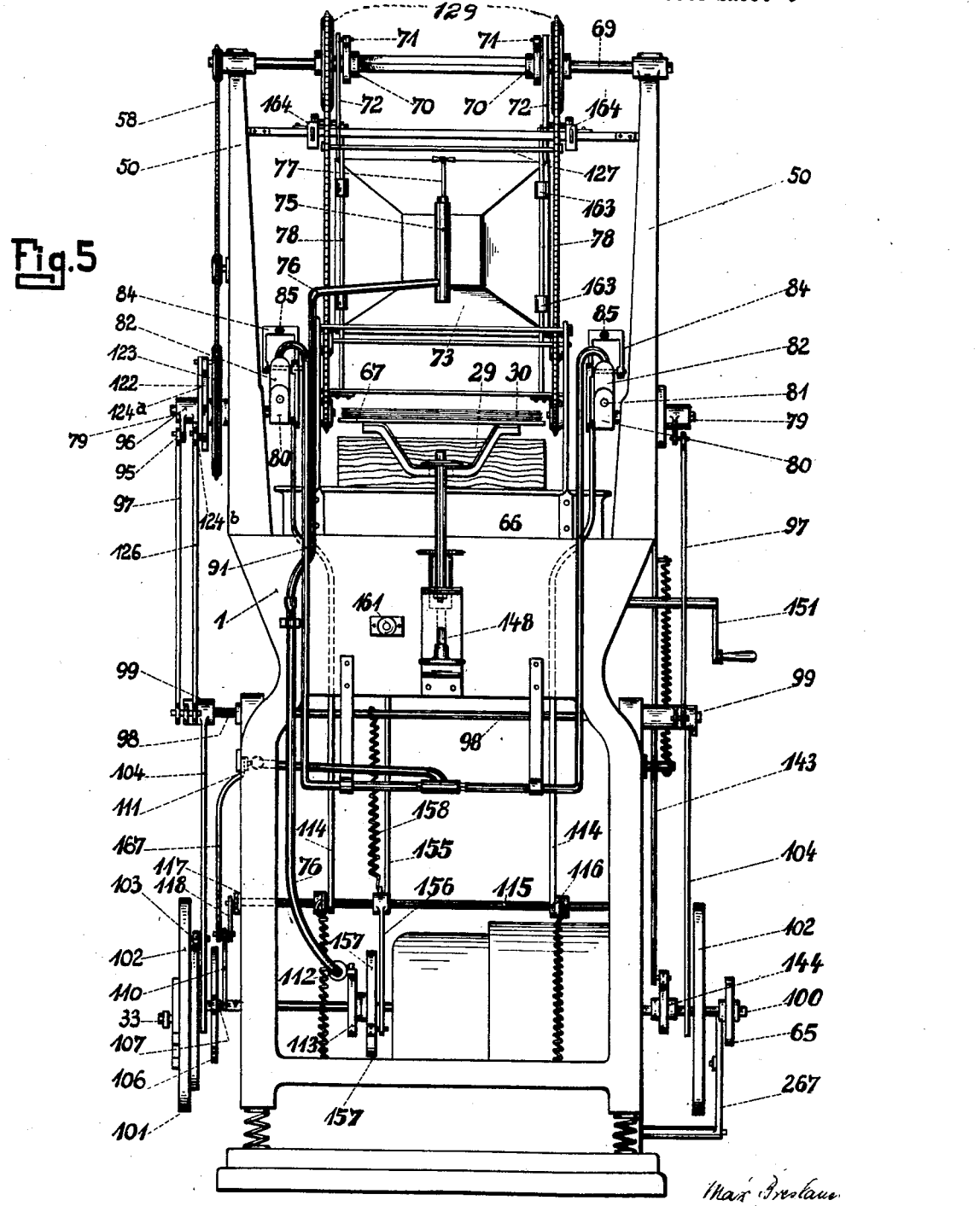

Jan. 10, 1928.　　　　　　　　　　　　　　　　1,656,138
M. BRESLAUER
METHOD AND MEANS FOR THE PHOTOGRAPHIC REPRODUCTION OF BOOKS,
DRAWINGS, AND THE LIKE, FOR REPRINTS
Filed Aug. 9, 1924　　　　7 Sheets-Sheet 6
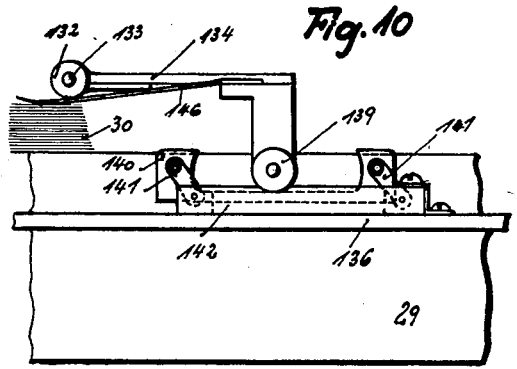
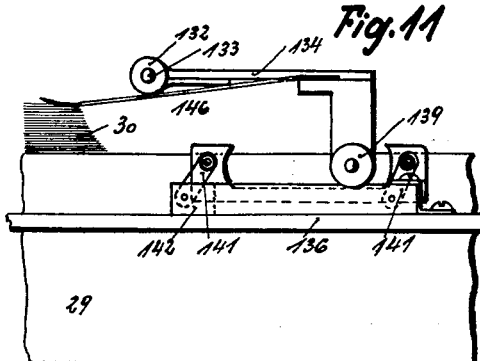
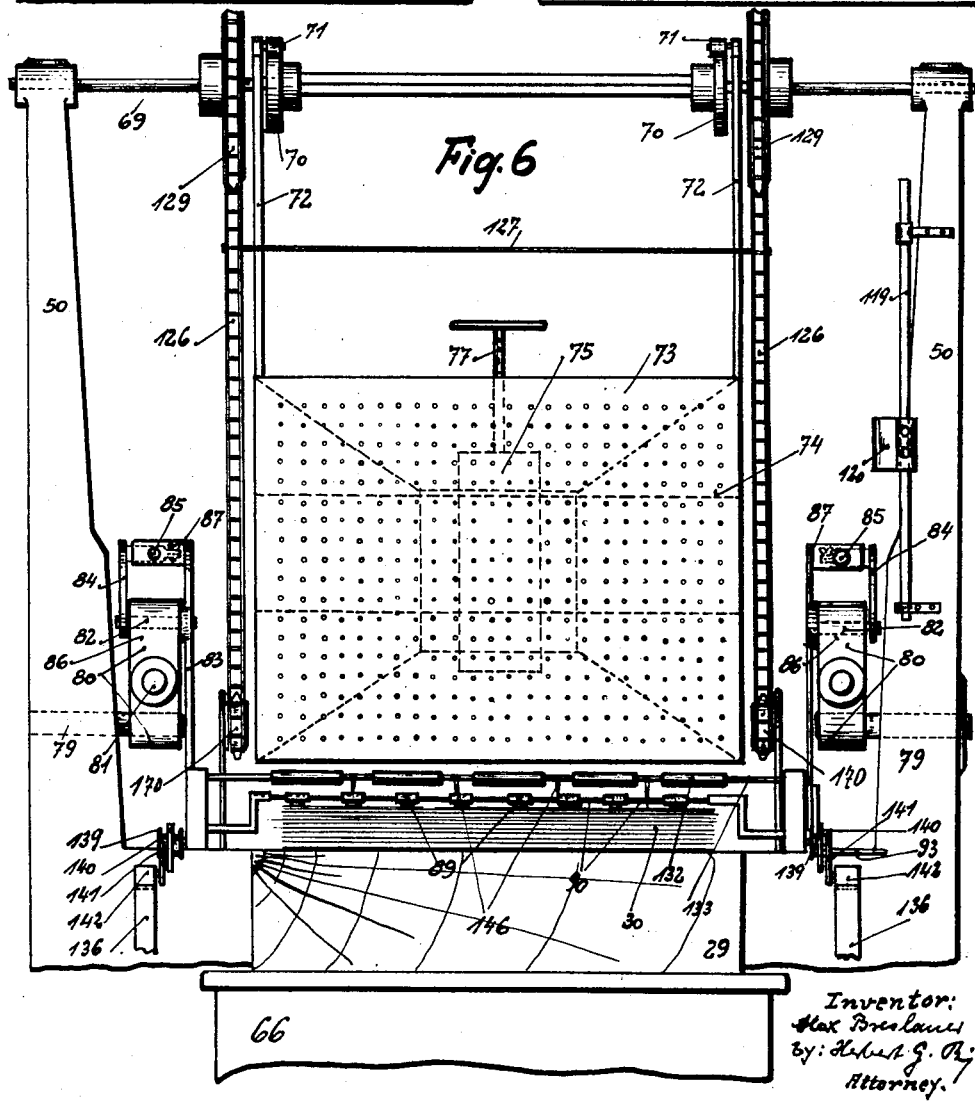

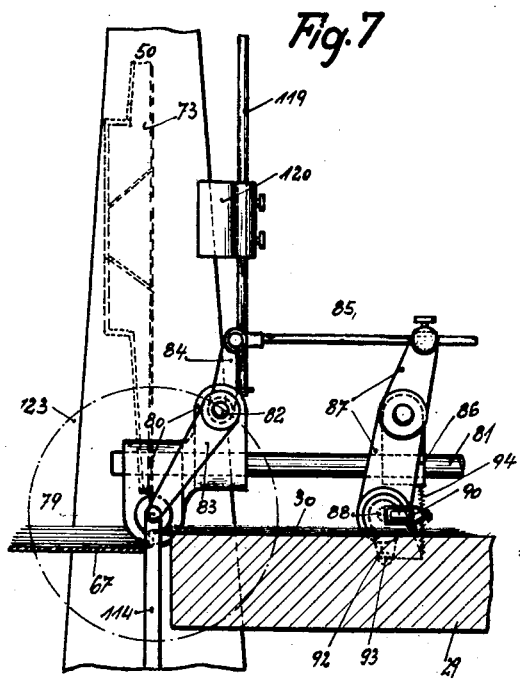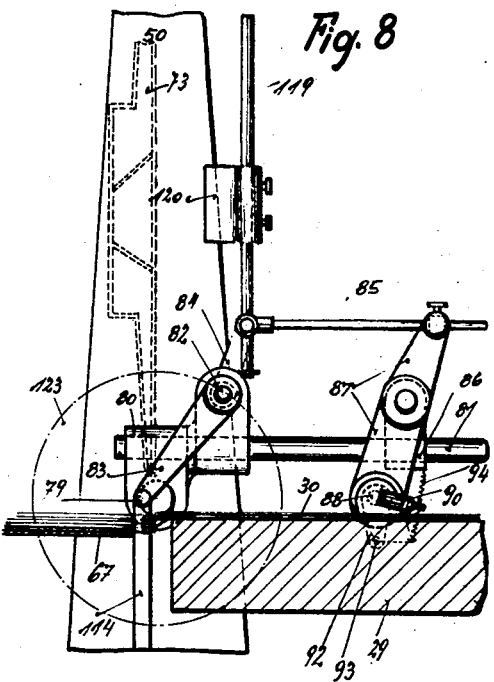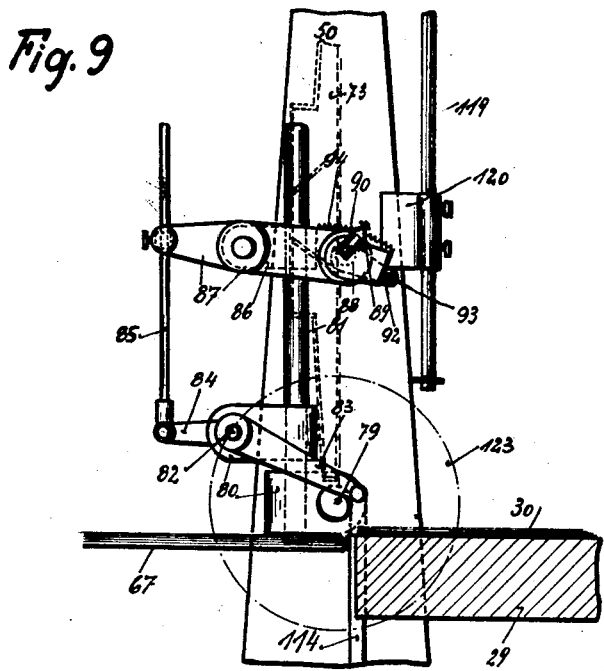

Patented Jan. 10, 1928.

1,656,138

UNITED STATES PATENT OFFICE.

MAX BRESLAUER, OF LEIPZIG, GERMANY.

METHOD AND MEANS FOR THE PHOTOGRAPHIC REPRODUCTION OF BOOKS, DRAWINGS, AND THE LIKE, FOR REPRINTS.

Application filed August 9, 1924, Serial No. 731,154, and in Germany April 28, 1924.

My invention relates to an apparatus for photographing automatically in proper succession the consecutive pages of a book, or sets of drawings or the like, and the gist of the invention resides in the means for lifting the leaf or sheet to be photographed, to hold it fast while it is photographed, and to convey it further thereafter.

Figure 1:
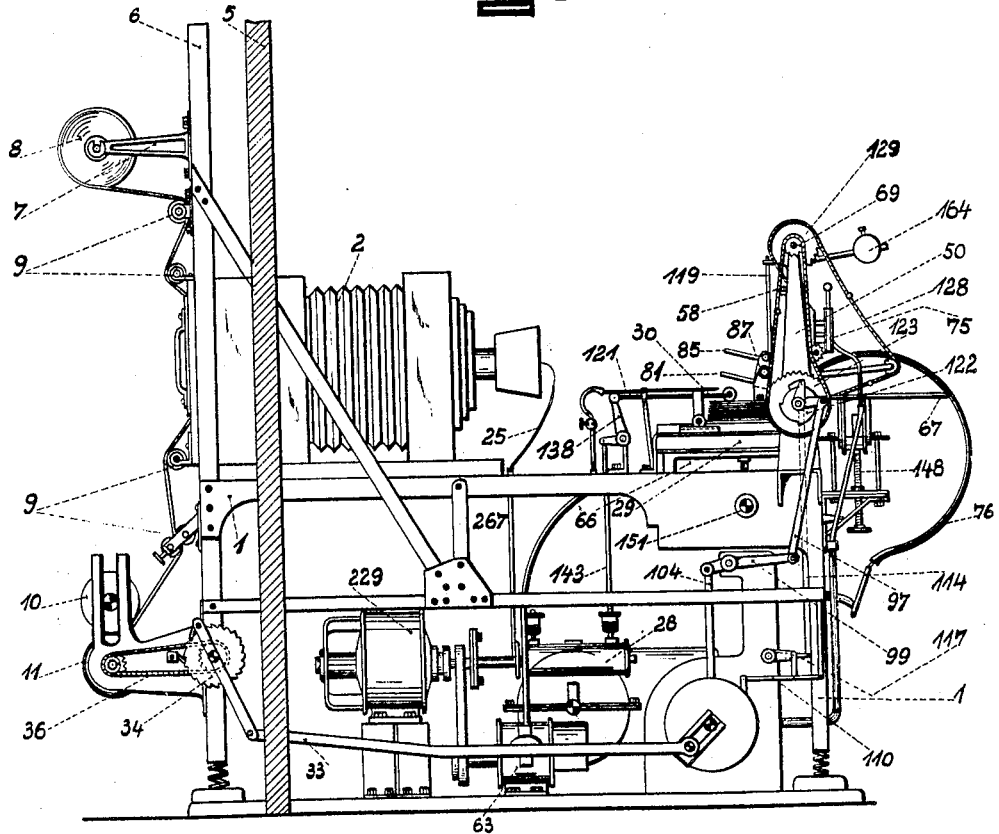
Figure 2:
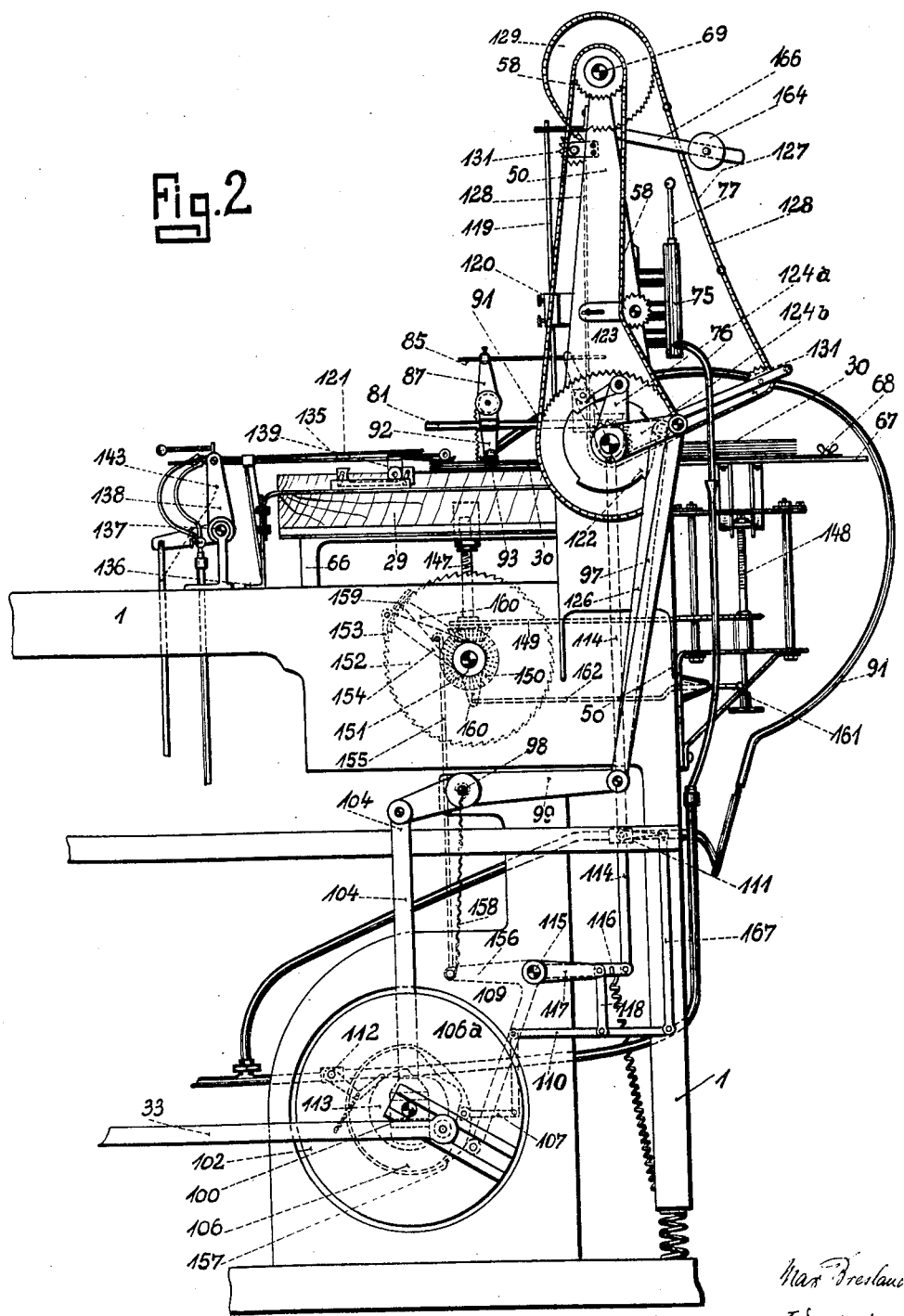
Figure 3:
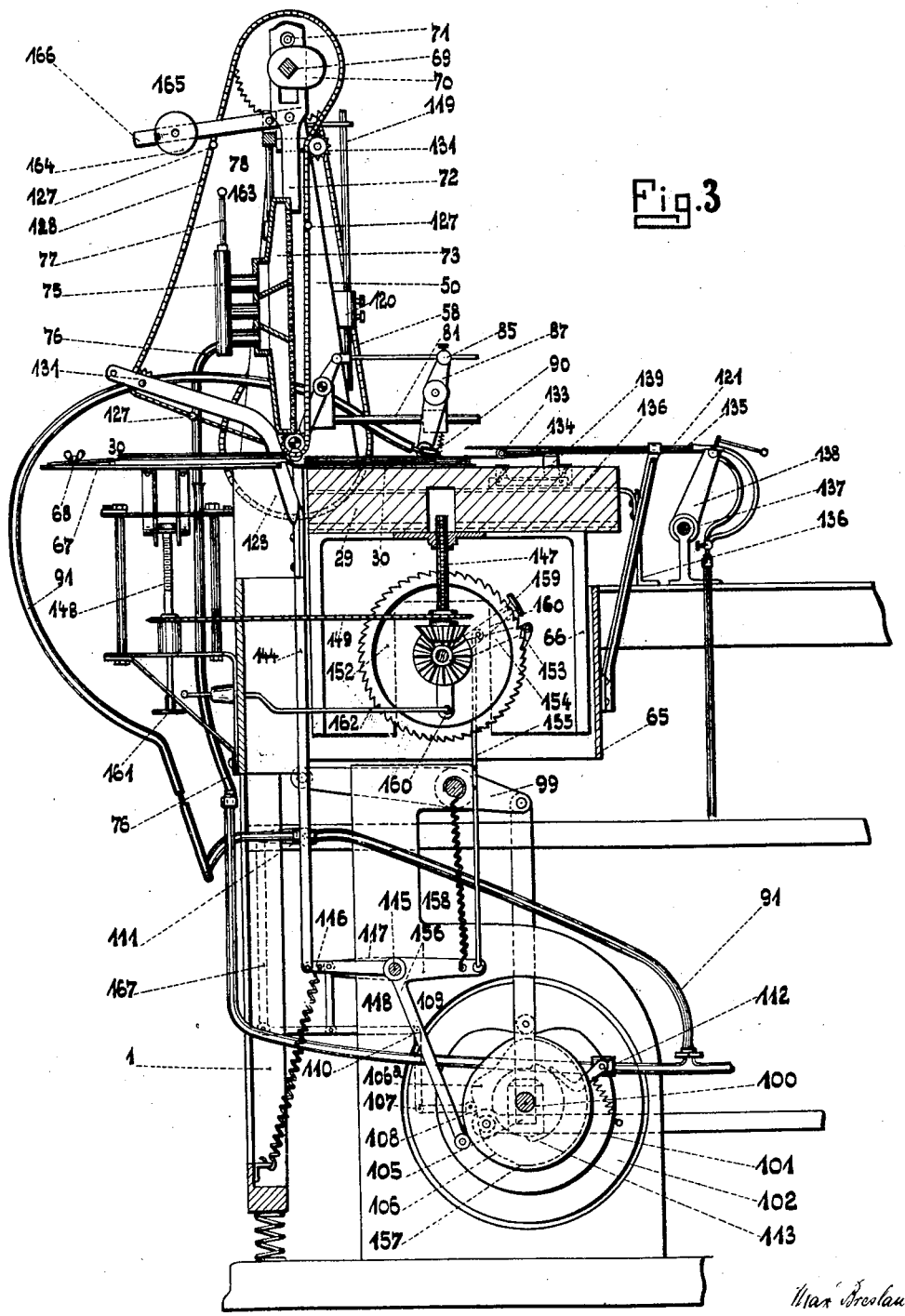

My invention is illustrated diagrammatically and by way of example in the accompanying drawings in which Figure 1 is a side-view of the entire machine; Figure 2 is a side-view of the leaf turning-over mechanism, drawn to an enlarged scale; Figure 3 is a vertical section through this mechanism; Figure 4 is a plan and Figure 5 a rear view thereof; Figure 6 is a view of the suction-chamber of the apparatus; Figures 7, 8, 9 show the suction-tube of the apparatus in various positions and Figures 10 and 11 show the smoothing roller of the apparatus also in various positions, as is fully described hereinafter.

1 denotes a frame which is supported on springs and carries at one of its ends a photographic apparatus 2 for taking pictures; this apparatus can be expanded in known manner. The rear end of the frame with the rear part of the photographic apparatus is located in a chamber 5 forming a dark-room. Within this chamber the frame carries standards 6 carrying on arms 7 a roll 8 located above the photographic apparatus, or the camera respectively, and carrying the sensitive film-band. This band is conducted over guide-rolls 9 in such a way that it passes along in front of the camera, and proceeds then to a roll 10 on which it can be wound up. This roll is movable vertically in slots of the standards 6 and is rotated in intervals in jerk-wise manner by means of a friction-roll 11 which is caused to contact with the film-band roll in the proper moment and for the proper period of time.

At the other end of the frame 1 a box 66 is movable vertically in guides 65 and carries a wooden plate 29, which receives the book 30, the leaves or pages of which must be turned up singly into vertical position in order to be photographed in this position whereafter the photographed leaf is turned down upon the book-cover which is supported on a plate 67 and held fast thereon by clamping members 68; similar members are provided also for holding fast the book 30 on the plate 29.

The plates 29 and 67 are so arranged relatively to one another that those leaves of the book which are the uppermost at the time being lie in one plane, and they are so connected with each other that the plate 67 is lowered when the plate 29 is raised, the length of the two short ways being exactly the same.

50 denotes standards which are secured to the frame 1 and support on their upper ends a shaft 69 provided with two cam-disks 70 co-operating at their peripheries with rolls 71 attached to rods 72 which are enlarged at their upper ends and provided with slots in these enlarged parts and embrace the shaft 69 therewith, as shown in Fig. 3. The lower ends of the rods 72 carry a sheet-metal box 73, one wall of which is perforated and which is subdivided by false bottoms 74 into a plurality of superposed chambers. Each of these latter is connected by means of a pipe with a cylinder 75 containing a piston 77 and connected with a suction-pipe 76. Any one of the pipes connecting the cylinder 75 with the individual chambers of the box 73 can be closed by the piston 77 whereby the area of the perforated wall of this box which is subjected to suction can be enlarged or reduced, as required.

When the shaft 69 is rotated, the box 73 is lifted and lowered, by means of the cam-disks 70, and while being so moved it is guided by rods 78 provided at the inner sides of the standards 50 by means of collars or sleeves 163. The box 73 is balanced by a poise 164 arranged shiftably on one end of a double-armed lever 166 fulcrumed at 165, the other end of the lever being jointed to the rod 72.

The book 30 is located on the table, relatively to the suction-box 73, so that the stitching place of the opened leaves lies exactly in the elongation of the perforated wall of said box so that the uppermost leaf of the book-part lying in front of the said box stands parallelly to, and contacts smoothly with, said perforated wall when it has been turned upwards for 90°.

In the lower part of each standard a turnable bolt 79 is supported; all these bolts are arranged co-axially, and each thereof carries on the inner side of the appertaining standard a block 80 carrying a rod 81 and a turnable bolt 82 arranged at right angles with respect to this rod. To the projecting end of each bolt 82 is secured a double-armed lever 83—84; the arm 84 thereof is connected with a rod 85. Another block 86 is arranged shiftably on the rod 81 and a double-armed lever 87 is hinged to this block. The upper end of this lever is connected with the rod 85, but is easily disconnectable therefrom. The other end of the lever 87 carries a turnable bolt 88.

The arrangement and combination of parts described in the preceding paragraph exist twice, viz., on the righthand side of the apparatus, and on the lefthand side thereof. There are, thus, two levers 87 with their appertaining bolts 88. These two bolts carry a flat tube 90 which is provided with a plurality of suckers 89 and is connected with a suction pipe 91. One of the bolts 88 is connected with a lever 92 located on the outside of the appertaining lever 87 and provided with a pin 93. Owing to the arrangement and combination of these parts the tube 90 can be turned relatively to the levers 87, but normally it is held by a spring 94 in such a position that the suckers lie on the uppermost page of the book 30 if the rods 81 are in horizontal position.

The projecting ends of the bolts 79, i. e. the ends projecting beyond the standards 50, are each connected rigidly with a ring 96 carrying an arm 95, to which is hinged one end of a lever 97, the other end of which is connected with a lever 99 fulcrumed at 98 at the frame of the apparatus.

Below the lever 99 the main shaft 100 of the apparatus is supported in the frame; the ends of this shaft project beyond the frame and carry each a disk 102 provided with a cam-way 101 co-operating with a roll 103 attached to a rod 104 connected at one end with one end of the double-armed lever 99 and having at its other end a slot 105 embracing the main-shaft 100, the rod 104 being guided in this way at the respective end.

The main-shaft 100 is driven by an electromotor 229 through the intermediary of a bevel-gearing 28 and an engaging and disengaging coupling. The electromotor actuates also an air-pump 63 with which the suction-pipes 76 and 91 are connected.

When the shaft 100 is rotated, the rod 104 is moved up and down by the cam 101 in regular intervals, but remains at rest for a certain period of time after every movement. The motion of the rod 104 is transmitted to the bolts 79 through the intermediary of the levers 99 and 97, the bolts being caused to oscillate through angles of approximately 90°. The rods 81 are so arranged on the bolts 79 that their ends carrying the suction pipe 90 are directed upwards in the position of rest of these rods. While the bolts 79 are being turned as just mentioned, the rods 81 move the suction pipe 90 towards and against the book and the suckers 89 then touch the uppermost page thereof, remain at rest for a few moments, and get back into their former position. When the air is sucked away through the suction-pipe 91, the uppermost leaf of the book adheres to the suckers 89 of the tube 90, and when the rods 81 are moved back into their former position the respective leaf is lifted into vertical position until it stands parallelly to, and contacts with, the perforated wall of the suction-box 73. The suction-pipe 91 is active only while the rods 81 are being moved, and the suction-pipe 76 to which the suction-box is connected is actuated only while said rods are at rest so that the leaf contacting with the perforated wall of the suction-box is held fast in this position.

The suction-pipe 91 is controlled by a cam-disk 106 secured to the main-shaft 100 and co-operating with a roll 108 attached to a horizontal rod 107 guided on the main-shaft by a slot provided at one of its ends, the other end being jointed to one arm of a bell-crank lever 110 fulcrumed at 109 to the frame of the apparatus; the other arm of this lever is connected by a rod 167 with a valve 111 arranged in the suction-pipe 91 and actuated by the just described motion-transmitting members.

For opening and closing the valve 112 of the suction-pipe 76 a separate cam-disk 113 is secured to the main-shaft 100.

When the roll 108 runs on the high part of the cam-disk 106 which occurs when the rods 81 stand practically vertically while being at rest, the valve 111 is closed, but when said roll runs on the lower part of said cam-disk which takes place while the rods 81 are lowered and lifted, the valve 111 is opened. The cam-disk 113 is so shaped that the valve 112 is closed while the valve 111 is open, and reversely. The cam-disk 106 has also a second object besides controlling the valve 111, viz, separating the uppermost leaf of the book from the other leaves and rendering more reliable the transfer of the leaf held by the suction-pipe 90 to the suction-chamber 73. Both actions are effected by turning the pipe 90 relatively to the block 86, or, in other words, by causing the rod 85 to turn the double-armed lever 87 carrying the said suction-pipe 90. The rod 85 is carried by an arm 84 projecting forth from a bolt 82, as already described, this arm being connected with one end of a rod 114, the other end of which is hinged to an arm 116 carried by a shaft 115.

An arm 117 is attached to the projecting end of the shaft 115, and the free end of this arm is connected by a rod 118 with the bell-crank lever 110 actuated by the cam-disk 106, as already mentioned. The lower part of this cam-disk on which the roll runs while the rods 81 are being slewed is so shaped that the rods 85 can share the slewed motion of the arms 81 without any change of their position relatively to these arms. This is possible only when the point of junction of the rod 114 with the lever 83 lies in the axis of turning of the bolts 79, as shown in Fig. 7.

In the middle of the lower part of the cam-disk 106, that is to say, at that point where the roll 108 is positioned when the suction-pipe 90 has arrived upon the uppermost leaf of the book, a small protuberance 106$^a$ is provided which causes a slight turning of the bell-crank lever 110. The extent of this turning motion is not so large that the valve 111 of the suction-pipe 91 could be closed thereby, but it is sufficient to lift the rod 114 whereby the bolt 82 is turned by means of the arms 83 and the rod 85 is shifted by the arm 84 (Fig. 8). Owing to this shifting of the rod 85 the double-armed lever 87 is turned on its pivot so that the suction-pipe 90 which up to this moment had been rested upon the book in flat position is shifted a little towards the back of the book, and turned over a little towards it, and while this shifting of the tube 90 takes place the uppermost leaves are raised by the suckers which consist of rubber so that said leaves bulge a little and are loosened relatively to one another, and only one thereof is lifted off the other ones when the rods 81 are lifted together with the suction-pipe 90.

While the rods 81 move upwards the rod 114 is again in its former position in which its point of junction with the arm 83 lies in the axis of rotation of the bolts 79 (Fig. 7). The rod 85 has also been moved back into its former position. Shortly prior to the rods 81 having re-assumed the vertical position, the pin 93 which as already mentioned, is affixed to the arm 92 pushed against an abutment-member 120 arranged adjustably on a rod 119, this abutment-member retaining the pin while the rod 81 is moved further forwards so that the bolt 88 is turned by the arm 92, the suction-pipe 90 which is rigidly connected with the bolt 88 sharing that turning and the spring 94 being put under tension thereby.

When the arms 81 are slewed upwards the position of the suction-pipe 90 is such that the suckers 89 are located on that side of this pipe which is remote from the suction-chamber 73, at which position the suction-pipe would render impossible a complete contact between the raised leaf and the suction-chamber 73 as it would be located therebetween. But owing to the turning of the tube 90 by means of the abutment lever 120, as mentioned, the suckers 89 have been turned downwardly towards the suction chamber 73, the leaf in question becoming vaulted and being laid mechanically against the front-wall of the suction-chamber 73, but its upper rim being still held fast by the suckers 89. The leaf is vaulted, in that its lower half is in contact with the front-wall of the suction-chamber 73, whereas its upper half extends obliquely in the direction to the suckers 89 of the suction-pipe 90 which is located in only a short distance thereof.

As soon as the rods 81 have re-assumed completely their position of rest, the roll 108 runs onto the high part of the cam-disk 106 whereby the bell-crank lever 110 is again caused to make an oscillation, in consequence whereof the valve 111 is closed. At the same time the valve 112 is opened by the cam-disk 113. Simultaneously with the oscillation of the bell-crank lever 110 also the rod 114 has been moved and has turned the arm 83 of the bolt 82 into the position shown in Fig. 9, whereby the arm 84 of the bolt 82 draws the rod 85 downwards and the double-armed lever 87 is turned for a certain angle on its pivot at the block 86. By this turning of the lever 87 the suction-pipe 90 is raised and at the same time turned, in the manner described, for another angle as the pin 93 of the arm 92 continues to contact with the abutment-member 120.

While these movements of the suction-pipe (which is no more active at the time being, as the valve 111 is now closed) are going on, the leaf having been held up to then by the suckers gets completely disconnected herefrom and gets to lie closely to the front-wall of the suction-chamber 73 which is now active, the valve 112 having been opened shortly before. The leaf remains, consequently, in its raised or vertical position and is photographed in this position. Relieving the objective closure of the camera 2 is also effected automatically from the main shaft 100 by the intermediary of a cam disk 265, a rod 267 and a wire that is shiftable in the helical spring 25.

The system of levers described remains at rest during this time as those parts of the cam-disks 101 and 106 whereon the rolls 103 and 108 are now running are circular. As soon, however, as the roll 108 runs onto the lower part of the cam-disk 106 the valve 112 is closed and the valve 111 opened and the rod 114 returns into the position shown in Fig. 7. Simultaneously therewith the roll 103 runs onto the lower part of the cam 101 so that the rods 81 swing downwards. In order to prevent the leaf (which is no more retained at the suction-chamber by the suction-air) from falling off the suction-chamber it is pressed thereagainst by currents of air issuing from nozzles 121 located in front of the book.

On one of the bolts 79, outside the appertaining standard 50, and at the side of the ring 96, is arranged, firstly, a loose ratchet-wheel 122 which is connected rigidly with a chain-wheel 123, and secondly a bell-crank lever 124, the arm 124ª of which carries a pawl engaging said ratchet-wheel, and the arm 124ᵇ of which is connected with the double-armed lever 99 by means of a rod 126 arranged parallelly to the rod 97. The lengths of the rod 126 and the lever-arm 124ᵇ are such that the ratchet-wheel is rotated when the double-armed lever 99 is turned for 90°. This motion is transmitted by a chain 58 to the shaft 69 in such a manner that this shaft performs a complete revolution. While the revolution is being performed the cam-disks lift the suction-chamber 73 so that the interstice between this latter and the book 30 is enlarged. There are, besides, while the shaft 69 is being rotated, moved two chains 128 connected with one another in regular intervals by transverse rods 127; these chains run over chain-wheels 129 affixed to the shaft 69, over chain-wheels 129ª and over the tension-wheels 131, and they are moved round the suction-box 73. While these chains and their transverse rods are thus being moved, one of these latter meets that part of the book-leaf which is situated below the suction-box and is pressed by the before-mentioned currents of air against the neighbouring wall of this box whereby that book-leaf part is bulged out rearwardly, into the now enlarged interstice between the suction-box and the book, is drawn away from this box, and stretched out upon the turned-back book-cover lying upon the plate 67.

In order to prevent the not yet photographed leaves of the book from being bulged out and opened by the air-currents in question, and to cause them to remain in flat position so that they cannot be impeditive while the photographic procedure is being carried through, a rod 133 provided with tubular rubber-pieces 132 is provided (Figs. 10 and 11) which forms a part of a frame 134 connected by a rod 135 with an arm 138 affixed to a shaft 137. Rolls 139 attached laterally to this frame run in guide-members 140 provided lefthand and righthand from the book and being suspended by arms 141 from blocks 142 secured to a frame 136. These arms have two end-positions; in one thereof (Fig. 10) they are directed towards the book, in the other (Fig. 11) they are directed away from the book. In the first of these positions the guide-members 140 which are carried by the arms 141 are in a deeper position than they are in the second position, in consequence whereof also the frame carried by said guide-members can have two positions of height, according to the position of the arms 141; when these latter are directed towards the book the rod 133 lies with its rubber-pieces 132 upon the book, but when the arms are directed off the book said members 132 133 are situated above the book. Generally the arms 141 are directed towards the book.

When the arms 81 are lowered, the frame 134 is drawn away from the book by the then occurring rotation of the shaft 137 whereby the rod 133 and the rubber-pieces 132 are drawn away from the book, the rolls 139 running during this phase in the guide members 140 until they arrive at the other end of the guide-ways which is that remote from the book. When the frame in question is moved further onward the rolls 139 carry the guide-members 140 along with them and turn the arms 141 so that these latter are swung into their other position and the guide-members 140 are raised, together with the frame secured to them.

The shaft 137 is rotated by means of rods 143 and by a cam-disk 144 affixed to the main-shaft 100.

At that place of book where up to then the rod 133 had rested, there now the suction-pipe 90 which has been slewed downwards by the rods 81 gets to lie on the book. When then the rods 81 again rise, the frame is again shifted towards the book by another rotation of the shaft 137, the rod 133 being hanging, for the time being, over the book as the guide members remain, for some time, in their highest position. When the rolls 139 arrive in that end of the guide-ways of the guide-members 140 which is adjacent to the book, they take these members along with them and cause thereby the arms 141 to turn back into their previous position, the guide-members being now moved downwards. The rod 133 contacts now again with the book and rolls along upon it for a certain length of way in the direction to the back of the book.

When the guide-members 140 have re-assumed their end-position which is their lowest position, the direction of motion of the frame is again reversed, the extent of this reverse motion being such that the rolls 139 get about into the middle of the guide-members 140. During this motion the rod 133 is locked by a ratchet-gear 145 so that the rubber-pieces slide over the book. In so doing they take with them along in known manner the uppermost leaves by friction, smoothen them, and draw them taut. The rod 133 remains now positioned closely at the edge of the book so that the leaves are held taut during the whole period of time now following; they cannot be blown upwards by the currents of compressed air and cannot disturb while the photographic procedure is being carried through.

To the frame are attached also highly elastic flat springs 146 or, in lieu thereof, bristles which bear constantly on the upper leaf of the book also after the frame has been withdrawn completely therefrom, when a leaf is lifted by the suction-pipe 90 the front end of the springs or bristles is lifted together with this pipe until they spring back when the leaf has been lifted to a certain height. If the suction-pipe should have caught two leaves instead of only one, then the free ends of the springs or the tips of the bristles when springing back, as mentioned, get between the edges of the two leaves and separate them, the said springs or bristles affording, thus, a protection against the carrying of more than one leaf to the suction-chamber.

The leaves of the book are turned over one after the other in that manner, and the leaf contacting with the suction members are photographed. Feeding the film band forward through the camera is effected likewise automatically from the main shaft 100 during that period of time in which the arms 81 are moved downwards. The rotatory motion of the main shaft is transmitted to the friction roll that carries the film receiving roller by means of a rod 33, a pawl mechanism 34, and a chain gearing 36.

The leaf-turning device described in the foregoing columns can operate, of course, only when the leaf to be carried to the suction-chamber is located in a certain definite height. Corresponding to the turning over of the leaves of the book the table 29 must be raised and the plate 67 lowered. For this purpose both the table and said plate are carried by spindles 147 and 148, of which one is provided with a right-hand thread, the other with a lefthand thread and which are coupled with one another by chain-wheels and a chain 149. The spindle 147 is connected with a shaft 151 by a bevel-wheel 150, and this shaft is provided with a ratchet-wheel 152 which co-operates with a pawl 153 carried by an arm 154 supported turnably by the shaft 151. The arm 154 is jointed by a rod 155 to a bell-crank lever 156 carried by the shaft 115; one arm of this lever bears with a roll on a cam-disk 157 affixed to the main-shaft 100. The constant contact between said roll and this cam-disk is maintained by a spring 158. When the bell-crank lever 156 is oscillated by the cam-disk 157 the ratchet-wheel 152 is rotated intermittently and the spindle 147 is rotated correspondingly whereby the table 29 is raised. The part-rotations of the spindle 147 are transmitted to the spindle 148 by the chain 149 so that also this other spindle is rotated correspondingly, but in the reverse direction, whereby the plate 67 is lowered.

In order to be in the position to adjust the slowness of the upward movement of the table and the downward movement of the plate in question, that part of the periphery of the ratchet-wheel 152 over which the pawl 153 moves when the arm 154 is moved can be covered wholly or partly by a disk 159 so that the pawl 153 either cannot engage the ratchet-wheel at all, or can do so only at a certain point of the periphery of this wheel whereby the part-rotation of this latter can be limited as required. The disk 159 is attached to a bell-crank lever 160 carried loosely on the shaft 151. This lever 160 can be adjusted by means of a rod 162 provided with a handle 161 and jointed to one arm of said lever. This arrangement and combination of parts permits to regulate very finely the slowness of the movement of the table and the plate in question.

Leaf after leaf of the book is actuated in the before-described manner and the upper page of each leaf is photographed; this having been accomplished throughout the entire book, this latter is turned as described, and again leaf after leaf is actuated in that manner, the other page of each leaf being now photographed, all as described. It is obvious that the production of photographic copies of books or the like in this way proceeds quickly and reliably and that perfectly faithful copies can be obtained by the apparatus described. I wish it, however, to be understood that I do not limit myself solely to the details shown and described. There are possible many departures in the details without departing from the gist of the invention.

I claim:

1. In an apparatus for the photographic reproduction of books, drawings and the like, onto a continuous film band the combination with a reproduction camera, means for supporting a film-band so as to be moved intermittently and in jerks, and means for winding said film-band from and winding it on film rolls of a suction chamber having a perforated front-wall; means for sucking air into this chamber through this wall; a movable suction-pipe and lateral suckers thereon adapted to be placed upon one of the uppermost leaves of the opened book; a bell-crank lever to which said suction-pipe is affixed; a cam-disk arranged to actuate said lever; a shaft to which said cam-disk is secured; and means for rotating said shaft, substantially as described.

2. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber having a perforated front-wall; means for sucking air into this chamber through this wall; a movable suction-pipe and lateral suckers thereon adapted to be placed upon one of the uppermost leaves of the opened book; another suction-pipe also arranged to co-operate with the book-leaves, and means for sucking air through said pipes; and slewable arms carrying said other suction-pipe, this latter being movable relatively, to said arms, substantially as described.

3. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber having a perforated front-wall; means for sucking air into this chamber through this wall; a suction-pipe arranged to co-operate with the book-leaves; two double-armed levers carrying said pipe; slewable arms carrying said levers, a rod connected with the free ends of the said levers; a cam-disk arranged to actuate said rod, and means for rotating said cam-disk, substantially as described.

4. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber having a perforated front-wall: means for sucking air into this chamber through this wall; a movable suction-pipe and lateral suckers thereon adapted to be placed upon one of the uppermost leaves of the book; double-armed levers carrying said suction-pipe and being so controlled that said suckers are placed in flat position upon the uppermost leaf of the open book to be photographed, and that the suction-tube is then turned a little around its longitudinal axis and is shifted toward the back of the book, substantially as described.

5. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber having a perforated front-wall; means for sucking air into this chamber through this wall; a movable suction-pipe and lateral suckers thereon adapted to be placed upon one of the uppermost leaves of the book; double-armed levers carrying said suction-pipe and a spring adapted to hold them generally in such a position that the suckers of said suction-pipe are placed flat upon the uppermost leaf of the book to be photographed when said double-armed levers are lowered; a crank-pin attached to the said suction-pipe. and a member by which said crank-pin is turned when the levers carrying this pipe are rising, and means for lifting these levers, substantially as set forth.

6. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber having a perforated front-wall; a suction-pipe and suckers thereon along it; air-sucking pipes connected with said chamber and said suction-pipe, and valves in said pipes; slewable arms carrying the said suction-pipe and being arranged to place it with the suckers downwards onto the open book; and means to control said valves in such a manner that the valve of the air-sucking pipe connected with the said suction-pipe is open when said arms are in motion, and that the valve of the air-sucking pipe connected with the said suction-chamber is open when the said arms are at rest, both valves being closed during the other periods, substantially as set forth.

7. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber having a perforated front-wall; a suction-pipe and suckers thereon along it; air-sucking pipes connected with said chamber and said suction-pipe, and valves in said pipes; slewable arms carrying the said suction-pipe and being arranged to place it with the suckers downwards onto the open book; means to control said valves in such a manner that the valve of the air-sucking pipe connected with the said-suction-pipe is open when said arms are in motion, and that the valve of the air-sucking pipe connected with the said suction-chamber is open when the said arms are at rest, both valves being closed during the other periods; a compressed-air pipe directed towards the book-leaf standing in front of said perforated wall; means to supply this pipe with compressed air, and means to control the supply of this air so as to cause it to act when the air-sucking pipe valve pertaining to the said suction-chamber is closed, substantially as set forth.

8. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls. of a suction chamber having a perforated front-wall; a suction-pipe and suckers thereon along it; air-sucking pipes connected with said chamber and said suction-pipe, and valves in said pipes; two endless chains arranged laterally from the said suction-chamber; chain-wheels therefor, and transverse rods connecting said chains one another and being arranged to travel around the suction-chamber; members carrying the said suction-pipe and being arranged to lift and to lower it; any of said transverse rods being adapted to act, when the suction-pipe is being lowered, to act on the book-leaf standing at the perforated suction-chamber wall, and then remove it therefrom, substantially as set forth.

9. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, a vertically movable suction-chamber having a perforated front-wall, and means for lifting and lowering it; a suction-pipe and suckers thereon along it; air-sucking pipes connected with said chamber and said suction-pipe, and valves in said pipes; two endless chains arranged laterally from the said suction chamber; chain-wheels therefor, and transverse rods connecting said chains with one another and being arranged to travel around the suction-chamber; members carrying the said suction-pipe and being arranged to lift and to lower it; any of said transverse rods being adapted to act, when the suction-pipe is being lowered, to act on the book-leaf standing at the perforated suction chamber wall, and to remove it therefrom; means for causing the said chains to travel intermittently, and means controlling the chain-driving means and the suction-chamber lifting means in such a manner that this chamber is lifted when the chains are moving, substantially as set forth.

10. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber and partition-walls therein and having a perforated front-wall; a suction-pipe and suckers thereon along it; air-sucking pipes connected with said chamber and said suction-pipe; and valves in said pipes; slewable arms carrying the said suction-pipe and being arranged to place it with the suckers downwards onto the open book; and means to control said valves in such a manner that the valve of the air-sucking pipe connected with the said suction-pipe is open when said arms are in motion, and that the valve of the air-sucking pipe connected with the said suction-chamber is open when the said arms are at rest, both valves being closed during the other periods, substantially as set forth.

11. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber and partition-walls therein and having a perforated front-wall; a suction-pipe and suckers thereon along it; air sucking pipes connected with said chamber and said suction-pipe, and valves in said pipes; slewable arms carrying the said suction-pipe and being arranged to place it with the suckers downwards onto the open book; and means to control said valves in such a manner that the valve of the air sucking pipe connected with the said suction-pipe is open when said arms are in motion, and that the valve of the air-sucking pipe connected with the said suction-chamber is open when the said arms are at rest, both valves being closed during the other periods, substantially as set forth.

12. In an apparatus for the photographic reproduction of books, drawings and the like, onto a continuous film-band the combination with a reproduction camera, means for supporting a film-band so as to be moved intermittently and in jerks, and means for winding said film-band from and winding it on film-rolls, of a suction-chamber and partition-walls therein and having a perforated front-wall; means for lifting and lowering said chamber; a suction-pipe having suckers along it; air-sucking pipes connected with said chamber and said suction-pipe, and valves in said pipes, slewable arms carrying the said suction-pipe and being arranged to place it with the suckers downwards onto the open book; and means to control said valves in such a manner that the valve of the air-sucking pipe connected with the said suction-pipe is open when said arms are in motion, and that the valve of the air-sucking pipe connected with the said suction-chamber is open when the said arms are at rest, both valves being closed during the other periods; two endless chains arranged laterally from the said suction chamber; chain-wheels therefor, and transverse rods connecting said chains with one another and being arranged to travel around the suction-chamber; members carrying the said suction-pipe and being arranged to lift and to lower it; any of said transverse rods being adapted to act, when the suction-pipe is being lowered, to act on the book-leaf standing at the perforated suction-chamber wall, and to remove it therefrom, substantially as set forth.

13. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber and partition-walls therein subdividing the suction-chamber into a plurality of cells; a perforated front-wall forming a part of the suction-chamber; an air-sucking pipe connected with the latter, and means for connecting this pipe, and disconnecting it from any one of said cells, substantially as set forth.

14. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber and partition-walls therein subdividing the suction-chamber into a plurality of cells; a perforated front-wall forming a part of the suction-chamber; an air-sucking pipe connected with the latter; a cylinder connected separately with said cells; an air-sucking pipe connected with said cylinder; a piston arranged in the latter and adapted to connect any of the said cells with, and disconnect it from said air-sucking pipe, substantially as set forth.

15. In an apparatus for the photographic reproduction of books, drawings and the like, onto a continuous film-band the combination with a reproduction camera, means for supporting a film-band so as to be moved intermittently and in jerks, and means for winding said film-band from and winding it on film rolls, of a suction-chamber having a perforated front-wall, and partition-walls subdividing into a plurality of cells; an air-sucking pipe connected with said cylinder; a piston arranged in the latter and adapted to connect any of the said cells with, and disconnect it from, said air-sucking pipe; a movable suction-pipe and lateral suckers thereon adapted to be placed upon one of the uppermost leaves of the opened book, a bell-crank lever to which said suction-pipe is affixed; a cam-disk arranged to actuate said lever; a shaft to which said cam-disk is secured; and means for rotating said shaft, substantially as described.

In testimony whereof I affix my signature.

MAX BRESLAUER.